United States Patent [19]

Blount

[11] Patent Number: 4,863,518
[45] Date of Patent: Sep. 5, 1989

[54] PRODUCTION OF POLYOL-ALKALI METAL SILICATE GLASS EMULSION

[76] Inventor: David H. Blount, 6728 Del Cerro Blvd., San Diego, Calif. 92120

[21] Appl. No.: 109,530

[22] Filed: Oct. 19, 1987

[51] Int. Cl.$^4$ .......................... C08K 3/34; C08K 5/06; C08L 83/02; C08J 3/06
[52] U.S. Cl. ........................................ 106/74; 106/75; 524/376; 524/377; 524/492; 524/789; 524/791
[58] Field of Search ................................ 524/376–377, 524/789, 492, 791; 106/74, 75

[56] References Cited

U.S. PATENT DOCUMENTS

| | | | |
|---|---|---|---|
| Re. 31,340 | 8/1983 | Blount | 521/127 |
| 3,929,439 | 12/1975 | Pierce | 106/74 |
| 3,960,532 | 6/1976 | Lazet | 65/22 |
| 4,042,536 | 8/1977 | Dieterich et al. | 521/122 |
| 4,136,238 | 1/1979 | Hieterhaus et al. | 521/116 |
| 4,234,639 | 11/1980 | Graham | 428/403 |
| 4,282,129 | 8/1981 | Blount | 521/122 |
| 4,296,211 | 10/1981 | Blount | 521/122 |
| 4,321,184 | 3/1982 | Blount | 524/423 |
| 4,325,859 | 4/1982 | Blount | 521/138 |
| 4,347,326 | 8/1982 | Iwami et al. | 106/75 |
| 4,353,999 | 10/1982 | Blount | 521/137 |
| 4,376,178 | 3/1983 | Blount | 524/556 |
| 4,378,249 | 3/1983 | Beale et al. | 106/74 |
| 4,755,226 | 7/1988 | Friedmann et al. | 106/74 |

Primary Examiner—Herbert J. Lilling

[57] ABSTRACT

A stable polyol-alkali metal silicate glass emulsion is produced by mixing a finely powdered alkali metal silicate glass, a liquid polyhydroxy compound, a small amount of salt-forming compound and an emulsifier, then agitating until the mixture emulsifies. This emulsion is useful in the production of polyurethane silicate and polyester silicate products.

12 Claims, No Drawings

PRODUCTION OF POLYOL-ALKALI METAL SILICATE GLASS EMULSION

BACKGROUND OF THE INVENTION

This invention relates to a process for the production of a stable polyol-alkali metal silicate glass emulsion by mixing a finely powdered alkali metal silicate glass and a liquid polyhydroxy compound, preferrably in the presence of a salt-forming compound and an emulsifier.

In the production of many polyurethane silicate products, it is preferable to use components which are relatively water-free because the water present will react with the polyisocyanate compound first before reacting with the polyol or alkali metal silicate. In other patented processes such as U.S. Pat. Nos. 4,282,129; 4,325,859; 4,331,578 and 4,376,178, an alkali metal silcate compound is utilized which contains water or is an aqueous solution. This process is an improvement over the previous process because no water is necessary to make a stable emulsion. The use of an emulsion of polyol-alkali metal silicate glass improves the production of polyurethane silicate resins and foams because the emulsion can be used in the existing polyurethane foaming machines. These polyurethane silicate products may be used for thermal and sound insulation, as construction panels, and as coating agents. The polyol-alkali metal silicate emulsion may also be used in the production of polyester silicate polymers and unsaturated polyester silicate resins. These polyester silicate products may be used as adhesives, as polyol silicates, as coating agents, in boat building, molding objects, etc. The emulsion may also be used in the production of polyesteramide silicate resins.

SUMMARY OF THE INVENTION

Polyol-alkali metal silicates glass emulsion are produced by mixing a liquid polyhydroxy compound with a finely powdered alkali metal silicate with an $SiO_2$:alkali metal oxide ratio of 1:1 to 20:1 preferrable 2:1 to 10:1. The finely powdered alkali metal silicate glass has some thixotropic and emulsifying properties, but these properties are not sufficient to produce a stable emulsion except when a large amount of the alkali metal silicate is used. When the polyol contains less than equal parts by weight of the finely powdered alkali metal silicate are improved in stability of the emulsion by the addition of a salt-forming compound and an emulsifier. The salt-forming compound also reduces the pH of the emulsion which is necessary when polyols, which contain ethylene oxide radicals, are used in polyurethane silicate production. The salt-forming compounds also improve the thixotropic properties of the alkali metal silicate glass by reacting with the alkali metal radicals.

The components may be mixed by any suitable means, under any suitable physical conditions. The components may be added separately or simultaneously.

The preferred process to produce the poly-alkali metal silicate glass emulsion is to mix the components simultaneously at ambient temperature and pressure. Under certain conditions, it is preferable to increase or decrease the pressure and also elevation in temperature speeds the formation of the emulsion. Temperatures between 15° C. to 100° C. are preferred.

A stable liquid polyol-alkali metal silicate glass emulsion is produced by mixing and emulsifying the following components:

Component A—a finely powdered alkali metal silicate glass;
Component B—a liquid polyol;
Component C—a salt-forming compound;
Component D—an emulsifying agent.

COMPONENT A

Any suitable alkali metal silicate glass may be used in this invention such as sodium, potassium and lithium silicate glass and mixtures thereof. The alkali metal silicate glass is preferred to be in the form of a finely powdered glass that will pass through a 65-mesh screen, preferably through a 200–300-mesh screen.

The alkali metal silicate glass may be produced by any of the commonly known methods such as melting sand with an alkali metal oxide, hydroxide, carbonate, sulfate or mixtures thereof until they react chemically and when cooled, will form a glass. The glass is then pulverized into a fine powder. The ratio of $SiO_2$:alkali metal oxide may be quite varied, from 1:1 to 20:1, preferably 2:1 to 10:1. This ratio is usually not too evenly distributed throughout the glass. Also there is some free alkali metal oxide present. In crude commercial glass products, there are usually small percentages of metal silicate and alkaline earth metal silicates present which may also be used. The preferred alkali metal silicate glass is sodium silicate glass.

COMPONENT B

Any suitable liquid polyol (organic polyhydroxyl compound), in particular, compounds which contain from 2 to 8 hydroxyl groups, especially those with a molecular weight of about 400 to about 6,000, e.g., polyesters, polyethers, polythioethers, polyacetals, polycarbonates, or polyester amides containing at least 2, generally from 2 to 8, but, preferably, dihydric alcohols, with the optional addition of trihydric alcohols, and polybasic, preferrably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, dimethylterephthalate and bis-glycol terephthalate. Any suitable polyhydric alcohol may be used, such as, for example, ethylene glycol; propylene-1,2- and -1,3-glycol; butylene-1,4- and -2,3-glycol; exane-1,6-diol; octane-1,8-diol; neopentyl glycol; cyclohexand-dimethenol-1(1,4-bis-hydroxymethylcyclohexane); 2-methylpropane-1,3-diol; glycerol; trimethylol; propane, pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid, such as ω-hydroxycaproic acid, may also be used.

The polyethers with at least 2, generally from 2 to 8 and, preferably, 2 or 3 hydroxyl groups used according to the invention are known and may be prepared, e.g., by the polymerization of epoxides such as ethylene oxide, butylene oxide, tetrahydrofurane oxide, styrene oxide or epichlorohydrin, each with itself, e.g., in the presence of $BF_3$, or by the addition of these epoxides, optionally, as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by the polymerizing styrene or acrylonitrites in the presence of polyethers (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, for instance, which may be prepared by reactions diols, e.g., propane-1,2-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymer, Volume XVI, "Polyurethane, Chemistry and Technology," published by Saunders-Frisch Interscience Publishers, New. York, London, Volume I, 1962, pages 32 to 42 and pages 44 to 54, and Volume II, 1964, pages 5 and 16 and pages 198 and 199, and in Kunststoff-Handbuch, Volume VII, Vieweg-Hochtlen, Carl-Hanser-Verlag, Munich, 1966, on pages 45 to 71.

COMPONENT C

Any suitable salt-forming compound may be used in this invention. Any compound that will react with the alkali metal oxide radical such as acyl chlorides, aliphatic chlorides, monofunctional alkylating agents, polyfunctional alkylating agents, organic acids, inorganic acid, carbon dioxide, substituted organic compounds, alkaline earth metal salts, ammonia salts, metal salts, hydrogen salts or mineral acid, organic anhydrides and mixtures thereof. Suitable acid includes, but is not limited to, inorganic acids such as sulfurous acid, sulfuric acid, hypophosphorous acid, phosphenic acids, phosphonous acids and phosphonic acids, glycolic acid, lactic acid, succinic acid, tartaric acid, oxalic acid, phthalic acid, trimellitic acid, adipic acid and the like. Further examples of acid may be found in U.S. Pat. No. 3,480,592. The phosphorous-containing salt-forming compounds are preferred, e.g., derivatives of phosphinic acid, phosphonous acid, phosphonic acids and phosphoric acids and esters of phosphorous and phosphoric acid and their thioanologues, e.g., hydroxy alkane phosphonic acid, phosphorous acid bis glycol ester, bis-(α-hydroxyisopropyl)-phosphinic acid,

COMPONENT D

Any suitable emulsifying agent may be used in this invention. The emulsifying agent may be an anionic, non-ionic and amphoteric surface-active compound or may be a foam stabilizer which is also an emulsifying agent or mixtures thereof. Suitable emsulsifying agents include, but are not limited to, anionic surface-acting compounds which can be broadly described as compounds which contain hydrophilic or lyophilic groups in their molecular structure and which ionize in an aqueous medium to give anions containing the lyophilic group, e.g., the sulfated or sulfonated alkyl, aryl and alkyl aryl hydrocarbons and alkali metal salts such as sodium salts of long chain alkyl sulfates, sodium salts of sulfonated abietenes, sodium salts or alkyl benzene sulfonic acids, particularly those in which the alkyl group contains from 8-24 carbon atoms; sodium salts of sulfonated mineral oils and sodium salts of sulfosuccinic acid esters; alkyl aryl sulfonic acid and their alkaline earth metal salts.

Nonionic surface-active compounds can be broadly described as compounds which do not ionize, but usually acquire hydrophilic characteristics from an oxygenated side chain, such as polyoxyethylene, while the lyophilic part of the molecule may come from fatty acids, phenols, alcohols, amides or amines. Examples of nonionic surfactants include products found by condensing one or more alkylene oxides or two to four carbon atoms, such as ethylene oxide or propylene oxide, with a relatively hydrophobic compound such as a fatty alcohol, fatty acid, sterol, a fatty glyceride, a fatty amine, an aryl amine, a fatty mercaptan, tall oil, etc.; also includes those products produced by condensing one or more relatively lower alkyl alcohol amines with a fatty acid to produce the corresponding amide; condensation products of ethylene oxide with hydrophobic compounds formed by condensing propylene oxide with propylene glycol and condensation products of a hydrophobic compound having at least 1 active hydrogen atom and a lower alkylene oxide.

Amphoteric surface-active compounds can be broadly described as compounds which have both anionic and cationic groups in the same molecules, e.g., sodium N-cocco beta amino propionate and sodium N-tallow beta amino dipropionate non-anionic surface-active compounds are preferred.

The stable polyol-alkali metal silicate emulsion is useful in the production of polyurethane silicate resinous and foamed products. The polyol-alkali metal silicate emulsion may be used in the polyurethane foaming machines which are made to handle a filler in the polyol component usually called Component B. The polyol-alkali metal silicate emulsion, optionally containing an amine catalyst, blowing agent and surface-active agent, is mixed with a polyisocyanate or isocyanate-terminated polyurethane prepolymer and is allowed to react, thereby producing a polyurethane silicate resinous or foamed product. The polyurethane silicate foam and resinous products have may uses, such as for thermal and sound insulation, as light-weight construction panels, and as coating agents for wood, metal and plastics.

The polyol-alkali metal silicate emulsion may also be used to produce alkali metal polyester silicate resinous products. The polyester alkali metal silicate resinous products may be used to produce polyurethane silicate resinous and foam products. The unsaturated alkali metal polyester silicate may be reacted with a vinyl monomer in the presence of a peroxide catalyst to produce solid resinous products.

The primary objects of this invention is to produce stable polyol-alkali metal silicate emulsions. Another object is to produce stable polyol-alkali metal silicate emulsions which will react with polyisocyanate compounds to produce useful polyurethane silicate solid and foamed products. Another object is to produce stable polyolalkali metal silicate emulsions that will react with polycarboxyl acids and polycarboxyl acid anhydrides to produce alkali metal polyester silicate resins. Another object is to produce a stable vinyl polymer-polyol-alkali metal silicate emulsion.

Other components may be added with the components in the production of polyol-alkali metal silicate emsulsion especially when the emulsion is to be used to produce a polyurethane silicate foam. Any suitable amine compound may be added, preferably in an amount up to 10% by weight, percentage based on the weight of Components A and B. Tertiary amines are the preferred amine. Tertiary amines are the preferred amine. Suitable tertiary amines include, but are not limited to, triethylamine, tributylamine, triethylenediamine, N-methyl-morpholine, N,N,N',N', -tetramethylenediamine, triethanolamine; N-methyl-diethanolamine and mixtures thereof.

Up to 10% by weight of organo-metallic compounds may be added with Components A and B, percentage based on the weight of Components A and B, preferably organic-tin compounds such as tin salts or carboxylic acid, e.g., tin acetate, tin octoate, tin ethyl hexoate, tin laurate and the dialkyl tin salts of carboxylic acids, such as dibutyl tin diacetate, dibutyl tin dilaurate, dibutyl-tin maleate or diocyl-tin diacetate.

Up to 20% by weight of a surface-active additive (emulsifiers and foam stabilizers), percentage based on weight of Components A and B, may be added with the Components A and B. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Suitable polymeric additives which are water-soluble and have the ability to hydrate and swell may be used as dispersion stabilizers in this invention.

Dispersion stabilizers such as salts of polymethacrylic acid, copolymeric poly(methacrylic acids), polymaleic acids and copolymeric polymaleic acids; watersolublederivatives of cellulose, plant gums, casein, starch, sodium alginate, bentonite, natural and synthetic latexes, sulfonated polyisoprene resins, sulfonated phenol-formaldehyde resins, sulfonated melamine-formaldehyde resins, polyamines, polysilicic acid, sodium poly(-methacrylic silicate), poly(sodium acrylic silicate), copolymeric poly(sodium acrylic silicate), poly(sodium methacrylic silicate), copolymeric poly(sodium methacrylic silicate), polyvinyl decanol, and mixtures thereof. The dispersion stabilizer may be used in an amount up to 10% by weight, percentage based on the polyol-alkali metal silicate emulsion.

Any suitable vinyl monomer may be used in this invention. Suitable vinyl monomers include, but are not limited to, styrene, vinyl acetates, sodium acrylate, acrylates, vinyl chloride, vinylidine chloride, acrylonitrile, vinyl toluenes. N-vinyl carbozole, vinyl pyrovidone, vinylidine cyanide, alkyl vinyl ketones, aryl vinyl ketones, methacrylonitrile and mixtures thereof.

Suitable acrylate compounds include, but are not limited to, methyl methacrylate, methyl acrylate, ethyl acrylate, propyl acrylate, butyl acrylate, pentadecyl acrylate, hexadecyl acrylate, benzyl acrylate, cyclohexl acrylate, phenyl ethyl acrylate, ethyl methacrylate, methyl chloroacrylate, 2-chloro-ethyl acrylate; 1,1-dihydroperfluorobutyl acrylate, ethylenemethacrylate, lauryl acrylate, cyclohexyl-cyclohexyl methacrylate, allyl methacrylate and mixtures thereof.

Acrylic acid compounds should be first reacted with an alkali metal radical to produce an alkali metal acrylate. Suitable acrylic acid compounds include, but are not limited to, acrylic acid, methacrylic acid, ethyl acrylic acid, benzyl acrylic acid, chloroacrylic acid, cyclohexyl acrylic acid, fluoroacrylic acid, cyclohexyl methacrylic acid, isobutyl methacrylic acid, crotonic acid, and mixtures thereof.

Up to 50% by weight of an organic diene may be added with the vinyl monomer, percentage based on the weight of the vinyl monomer. Suitable organic dienes include, but are not limited to, isoprene, chloroprene, butadiene and mixtures thereof. The organic dienes are added at a temperature and pressure wherein the diene is in a liquid or pressurized state.

Any suitable initiator which will promote the polymerization of a solution of a vinyl monomer may be used in this invention. The controlled polymerization of the vinyl monomer in the aqueous alkali metal silicate, in order to yield fully cured solids, usually requires the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzoyl perozide, cumene hydroperoxide, tert-butyl hypoperoxide, methyl amyl ketone peroxide, lauroyl peroxide, lauroyl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline, and aliphatic thiols, such as, for example, lauryl mecaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

The stable vinyl monomer polyol-alkali metal silicate emulsion is useful in the production of vinyl polymer-polyurethane silicate resinous and foamed products. The vinyl polymer-polyol-alkali metal silicate emulsion may be used in the polyurethane foaming machines which are made to handle a filler in the polyol component, usually called Component B. The vinyl polymer-polyol-alkali metal silicate emulsion, optionally containing an amine catalyst, blowing agent, organo-metallic compound and surface-active agent, is mixed with a polyisocyanate or isocyanate-terminated polyurethane prepolymer and is allowed to react, thereby producing a vinyl polymer-polyurethane silicate resinous or foamed product. The vinyl polymer-polyurethane silicate foam and resinous products have many uses, such as for thermal and sound insulation, as light-weight construction panels, and as coating agents for wood, metal and plastics.

The preferred method to produce vinyl polymer polyolalkali metal silicate emulsion is to mix the polyol vinyl monomer, peroxide initiator and suitable salt, forming a compound, then to add the alkali metal silicate while agitating between ambient temperature and the boiling point of the vinyl monomer at ambient pressure for 10 to 60 minutes except when the vinyl monomer is a gas, then to cool the mixture while agitating, thereby producing a stable vinyl polymer-polyol-alkali metal silicate emulsion. When the vinyl monomer is a gas such as vinyl chloride, it is slowly added to the mixture of the component while agitating in a closed system at a suitable temperature.

The components may be mixed in any suitable method, such as simultaneously or by mixing any two components first, then adding the third component last, agitating between 5° C. and 100° C. for 10 to 60 minutes, then cooling while still agitating.

The components may be mixed in any suitable proportions, the preferred proportions being 1 to 50 parts by weight of a fine alkali metal silicate glass powder to 25 parts by weight of a polyol and 1 to 50 parts by weight of a vinyl monomer and a catalytic amount of a peroxide initiator. The salt or salt-forming compound is is added in the amount up to 10 parts by weight.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 50 parts by weight of a polypropylene triol, mol. wt. 3000, hydroxyl No. 56, and 50 parts by weight of a powdered sodium silicate glass which passes through a 65-mesh screen, $SiO_2:NaO$ ratio of 3.2, are mixed and form a thick stable polyol-sodium silicate emulsion.

EXAMPLE 2

Example 1 is modified wherein 0.5 parts by weight of a nonionic surfactant, octylphenoxypolyethoxyethanol, and 1 part by weight of adipic acid is thoroughly mixed with the emulsion. The emulsion becomes more fluid, viscosity is decreased. The adipic acid assists in increasing the thixotropic effect and also lowers the pH by reacting with the free sodium oxide radicals, thereby improving the emulsion properties for use in a polyurethane foaming machine and in polyurethane silicate production.

EXAMPLE 3

About 50 parts by weight of polypropylene triol, mol. wt. 3000, hydroxyl no. 42, a powdered sodium silicate glass which passes through a 200-mesh screen, and has an $SiO_2:NaO$ ratio of 3.22:1, 1 part by weight of an anionic surfactant, dioctyl sodium sulfosuccinate, and 2 parts by weight of acetic acid are mixed thoroughly, thereby producing a stable polyol-sodium silicate emulsion.

EXAMPLE 4

About 60 parts by weight of a polyol, selected from the list below, and 40 parts by weight of a finely-powdered sodium silicate glass which passes through a 300-mesh screen, 0.5 parts by weight of a silicone surfactant and foam regulator (DOW 193 by DOW) and 2 parts by weight of a salt-forming compound, selected from the list below, are mixed thoroughly, thereby producing a stable polyolsodium silicate glass emulsion.

| Example | Polyol | Organic acid |
| --- | --- | --- |
| a | polyethylene glycol (mol. wt. 380) | phthalic acid |
| b | polyethylene glycol (mol. wt. 600) | phthalic anhydride |
| c | polyethylene glycol (mol. wt. 1000) with equal parts by weight of polypropylene glycol (mol. wt. 600) | equal parts benzoic acid and adipic acid |
| d | polypropylene glycol (mol. wt. 600) | acetic acid |
| e | polypropylene triol (hydroxyl no. 56) | oleic acid |
| f | amine sucrose polyether polyol (hydroxyl no. 350) | fumaric acid |

-continued

| Example | Polyol | Organic acid |
|---|---|---|
| g | castor oil | concentrated phosphoric acid |
| h | sucrose polyether polyol (hydroxyl no. 470) | sodium hydrogen sulfate |
| i | aromatic polyester polyol (hydroxyl no. 270) | calcium chloride |
| j | poly(oxyalkylene)triol (hydroxyl no. 57) | concentrated sulfuric acid |
| k | polyester resin (0.5 mol. of adipic acid and 4 mols. of glycerol) | chloroacetic acid |
| l | glycerol | phenol |
| m | liquid phenol formaldehyde resin with free hydroxyl groups | cresol |
| n | butadiene homopolymer (Poly bd R-45 HT by ARCO),(hydroxyl no. 42.1) | concentrated hydrochloric acid |
| o | styrene copolymer (poly bd CS-15 by ARCO) (hydroxyl no. 36.5) | adipic acid |
| p | acrylonitrile copolymer (poly bd CN-15 by ARCO) (hydroxyl no. 33.7) | aluminum chloride |
| q | polypropylene glycol modified with ethylene glycol(hydroxyl no. 49) | aluminium sulfate |
| r | amine-based polyol (Multranol 4050 by MOBAY) (hydroxyl no. 630) | ammonium sulfate |
| s | polyurea-filled polyether polyol (MULTRANOL 9151) (hydroxyl no. 28) | para-aminobenzoic acid |
| t | sorbitol-base polyol, (hydroxyl no. 490) | sodium dihydrogen phosphate |
| u | polypropylen triol (NIAX LHT-240 by Union Carbide) (hydroxyl no. 238) | methacrylic acid |
| v | propylene oxide polyols (NIAX LG-168 by Union Carbide) (hydroxyl no. 168.5) | epichlorohydrin |
| w | ethylene oxide/propylene oxide polyol (NIAX 16–56 by Union Carbide) | phosphinic acid |
| x | aromatic amine polyol, (hydroxyl no. 530) | phosphonic acid |
| y | polypropylene diol (hydroxyl no. 111) | phosphonous acid |
| z | mixture of the above | mixture of the above |

EXAMPLE 5

Example 4 is modified wherein the sodium silicate glass $SiO_2$:NaO ratio is selected from the list below:
(a) 1:1; (b) 2:1; (c) 2.8:1; (d) 3:1; (e) 3.4:1; (f) 3.6:1;(g) 4:1; (h) 5:1; (i) 6:1; (j) 7:1; (k) 8:1; (l) 10:1.

EXAMPLE 6

Example 3 is modified wherein the sodium silicate glass is substituted for another alkali metal silicate glass listed below:
(a) potassium silicate;
(b) lithium silicate.

EXAMPLE 7

About 25 parts by weight of a liquid or solution of one of the organic polymers listed below; 50 parts by weight of a polypropylene triol, mol. wt. 3000, hydroxyl no. 56; 1 part by weight of adipic acid and 50 parts by weight of sodium silicate glass, $SiO_2$:NaO ratio of 3.22:1, which passes through a 200-mesh screen, are thoroughly mixed, thereby producing a stable organic polymer-polyol-sodium silicate glass emulsion:

| Example | Liquid polymer or polymer in a solvent |
|---|---|
| a | 40% by weight of polystyrene in styrene; |
| b | 40% by weight of poly(methyl methocrytate) in methyl methacrylate; |
| c | liquid polyisoprene; |
| d | liquid polyvinyl acetate; |
| e | liquid poly(vinylidene chloride); |
| f | liquid poly(alkyl vinyl ketones; |
| g | mixtures of the above. |

EXAMPLE 8

About 25 parts by weight of powdered sodium silicate glass with a $SiO_2$:NaO ratio of 2:1 which passes through a 200-mesh screen, 25 parts by weight of a vinyl monomer selected from the list below, 50 parts by weight of a polypropylene glycol, mol. wt. 600, 0.5 parts by weight of sodium doctyl sulfosuccinate, 0.5 parts by weight of triethylenediamine, 0.05 parts by weight of cobalt naphthanate, 0.05 parts by weight of tin octoate, 0.1 part by weight of potassium persulfate, 0.005 part by weight of N,N-dimethyl aniline, 0.1 part by weight of benzoyl peroxide, 0.005 parts by weight of cupric sulfate are mixed. The mixture is vigorously agitated at a temperature just below the boiling temperature of the vinyl monomer in a closed system until the mixture is emulsified and is then cooled to ambient temperature while agitating, thereby producing a stable vinyl copolymer polyolalkali metal silicate glass emulsion, then about 0.5 part by weight of hydroquinone is added to the emulsion:
(a) styrene;
(b) acrylonitrile;
(c) methyl methacrylate;
(d) sodium methacrylate;
(e) vinyl acetate;
(f) vinylidene chloride;
(g) vinyl pyrovidone;
(h) methacrylonitrile;
(i) allyl methacrylate;
(j) vinyl totuene;
(k) ethyl acetate;
(l) vinyl chloride slowly added at 45° to 55° C.;
(m) mixtures thereof.

EXAMPLE 9

Example 8 is modified wherein 25% of the vinyl monomer is replaced with an organic diene selected from the list below:
(a) isoprene;
(b) chloroprene;
(c) butadiene at a temperature at about 50° C. and a pressure of 45 to 60 psig.

EXAMPLE 10

Example 8 is modified wherein the vinyl monomer is replaced with an organic diene monomer selected from the list below:
(a) isoprene at ambient temperature and pressure;
(b) chloroprene at ambient temperature and pressure;
(c) butadiene at a temperature at about 50° C. and a pressure of 45 to 60 psig.

EXAMPLE 11

Example 3 is modified wherein 2 parts by weight of a dispersant agent is added to the components and selected from the list below:

(a) sodium acrylate;
(b) polymethacrylic acid;
(c) bentonite;
(d) starch;
(e) casein;
(f) polymaleic acid;
(g) sodium alginate;
(h) polysilicic acid.

Although specific conditions and ingredients have been described in conjunction with the above Examples of the preferred embodiments, these may be varied and other reagents and additives may be used, where suitable, as described above, with similar results.

Other modifications and applications of this invention will occur to those skilled in the Art, upon reading this disclosure. These are intended to be included within the cope of this invention as defined in the appended Claims.

I claim:

1. The process for the production of a stable polyolalkali metal silicate glass emulsion, which contains no water, by mixing the following Components:
   (A) finely powdered alkali metal silicate glass, in the amount of 1 to 50 parts by weight;
   (B) polyol, 25 parts by weight;
   (C) salt-forming compound, up to 10 parts by weight;
   (D) emulsifier, up to 10 parts by weight.

2. The product produced by the process of claim 1.

3. The process of claim 1 wherein the alkali metal silicate glass is selected from the group consisting of sodium silicate glass, potassium silicate glass, lithium silicate glass and mixtures thereof.

4. The process of claim 1 wherein the polyol is selected from the group consisting of polyhydric alcohol, polyesters, polyethers, polythioethers, polyacetals, polycarbonates, polyester amides, containing at least 2 hydroxyl groups, and mixtures of polyester and polyether polyols.

5. The process of claim 1 wherein the salt-forming compound is selected from the group consisting of organic acids, inorganic acids, substituted organic compounds, alkaline earth metal salts, metal salts, hydrogen salts of mineral acids, organic anhydrides and mixtures of inorganic and organic acids.

6. The process of claim 1 wherein an amine compound in the amount up to 10%, based on weight of Components A and B, is added with Components A and B.

7. The process of claim 1 wherein up to 20% by weight, based on weight of Components A and B, of an emulsifying agent is added with Components A and B.

8. The process of claim 1 wherein up to 20% by weight based on weight of Components A and B, of a foam stabilizer is added with Components A and B.

9. The process of claim 1 wherein the polyol is polyether polyol.

10. The process of claim 1 wherein the salt-forming compound is and inorganic acid.

11. A stable polyol-sodium silicate glass emulsion, which contains no water, produced by mixing the following components:
    (A) finely powdered sodium silicate glass, in the amount of 1 to 50 parts by weight;
    (B) polyol, 25 parts by weight;
    (C) inorganic salt-forming compound, up to 10 parts by weight;
    (D) emulsifier, up to 10 parts by weight.

12. A stable polyol-sodium silicate glass emulsion, which contains no water, produced by mixing the following components:
    (A) finely powdered sodium silicate glass, in the amount of 1 to 50 parts by weight;
    (B) polyol, in the amount of 25 parts by weight;
    (C) organic salt-forming compound, in the amount of up to 10 parts by weight;
    (D) emulsifier, in the amount up to 10 parts by weight.

* * * * *